United States Patent [19]
Rekar et al.

[11] Patent Number: 5,991,704
[45] Date of Patent: Nov. 23, 1999

[54] FLEXIBLE SUPPORT WITH INDICATOR DEVICE

[75] Inventors: Robert S. Rekar, New Baltimore; John R. Busch, Redford; George Husulak, Sterling Heights, all of Mich.

[73] Assignee: Chrysler Corporation, Auburn Hills, Mich.

[21] Appl. No.: 09/048,762

[22] Filed: Mar. 26, 1998

[51] Int. Cl.⁶ ................................................... G01B 3/22
[52] U.S. Cl. ........................... 702/168; 702/167; 33/556; 483/19; 483/31
[58] Field of Search .................................. 702/150, 152, 702/153, 155, 167, 168; 33/501, 503, 555, 556, 501.13; 483/19, 31; 73/866.5, 572, 573, 549, 558, 561, 551, 553, 555, 162; 901/42; 364/468.26, 468.02

[56] References Cited

U.S. PATENT DOCUMENTS

| | | | |
|---|---|---|---|
| 3,476,013 | 11/1969 | Zemberry | 131/247 |
| 4,473,953 | 10/1984 | Sauvage | 33/505 |
| 4,547,772 | 10/1985 | Ernst | 33/501 |
| 4,558,312 | 12/1985 | Yonemoto et al. | 340/680 |
| 4,591,944 | 5/1986 | Gravel | 361/170 |
| 4,760,851 | 8/1988 | Fraser et al. | 128/774 |
| 4,769,763 | 9/1988 | Trieb et al. | 702/168 |
| 4,965,571 | 10/1990 | Jones | 340/932.2 |
| 5,191,717 | 3/1993 | Fujitani et al. | 33/503 |
| 5,222,034 | 6/1993 | Shelton et al. | 702/152 |
| 5,287,629 | 2/1994 | Pettersson | 33/503 |
| 5,299,361 | 4/1994 | Fiedler | 33/559 |
| 5,380,978 | 1/1995 | Pryor | 219/121.64 |
| 5,481,811 | 1/1996 | Smith | 33/573 |
| 5,528,011 | 6/1996 | Kono et al. | 219/86.41 |
| 5,535,524 | 7/1996 | Carrier et al. | 33/503 |
| 5,579,246 | 11/1996 | Ebersbach et al. | 702/95 |
| 5,594,668 | 1/1997 | Bernhardt et al. | 702/95 |
| 5,610,846 | 3/1997 | Trapet et al. | 702/95 |
| 5,768,792 | 6/1998 | Raab | 33/503 |
| 5,848,480 | 12/1998 | Sola et al. | 33/573 |

*Primary Examiner*—Marc S. Hoff
*Assistant Examiner*—Kendrick P. Patterson
*Attorney, Agent, or Firm*—Roland A. Fuller III

[57] ABSTRACT

An adjustable support structure having an indicator device for use with a coordinate measuring machine (CMM) capable of minimizing deformation of an object to be measured. The adjustable support structure includes a base portion being secured to a pillar support of the CMM. A top and bottom swivel plate are further included in the adjustable support structure and are mounted to the base portion to frictionally retain a first swivel arm. Additional swivel arms are pivotally mounted to the first swivel arm. A point support post and locking nut are still further included and threadedly engaged with an end of the final support arm. The indicator device is finally included for indicating when the point support post is in electrical contact with the object, so as to maximize support of the object while minimizing deformation thereof.

13 Claims, 3 Drawing Sheets

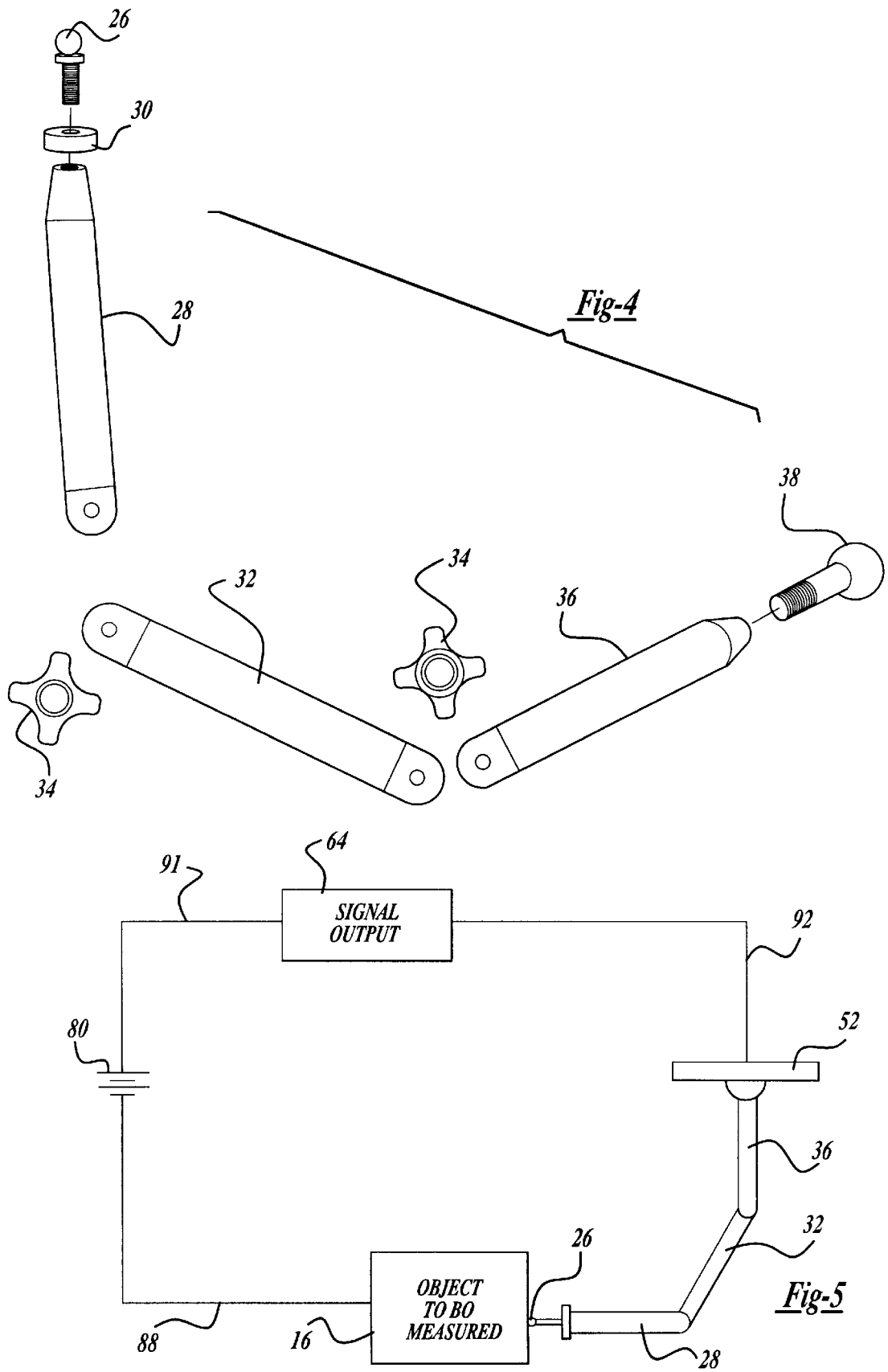

FLEXIBLE SUPPORT WITH INDICATOR DEVICE

BACKGROUND OF THE INVENTION

1. Field of the Invention

The present invention relates to a coordinate measuring machine and, more particularly, to a coordinate measuring machine having an adjustable support structure with an indicator device. The invention also relates to a method of using the same.

2. Background and Summary of the Invention

Coordinate measuring machines (CMM) are commonly used to measure the shape or configuration of an object. To this end, a point on the object is measured relative to its position in a 3-dimensional coordinate system as defined by the CMM. CMM's typically have a measuring element support structure, which can be moved in three mutually perpendicular directions. The measuring element support structure carries a measuring element whose position, when placed upon a surface of the object, is determined relative to the 3-dimensional coordinate system. Such coordinate measuring machines are extremely accurate and, consequently, any deformations occurring in the object will influence the measuring results.

Portable versions of CMM's are commonly used by operators to perform manual measurements of various objects. However, because of the force exerted on the object by the operator's manual manipulation of the portable CMM probe arm, deformation of the object may result. Specifically, deformation occurs when an operator places the probe of the portable CMM upon the object. The force of placement causes the object to be deformed incrementally.

Accordingly, there exists in the art a need for support means to minimize such deformations. Furthermore, such support means must also minimize inverse deformation, such as that caused by forcing a support against the object to be measured.

Accordingly, it is an object of the present invention to provide an adjustable support structure capable of minimizing deformation of an object to be measured. The adjustable support structure includes a base portion being secured to a pillar support of the CMM. A top and bottom swivel plate are further included in the adjustable support structure and are mounted to the base portion for frictionally retaining a swivel ball disposed on an end of a first swivel arm. Additional swivel arms are pivotally mounted to the first swivel arm. A point support post and locking nut are further included and threadedly engaged with an end of the final support arm. In this manner, the adjustable support structure may be fixedly attached to the pillar support of the portable CMM and adjusted so as to provide rigid support of an object adjacent an area to be measured.

It is another object of the present invention to provide an adjustable support structure for supporting an object to be measured capable of indicating when the point support post is in electrical contact with the object, so as to maximize support of the object while minimizing deformation thereof.

Further areas of applicability of the present invention will become apparent from the detailed description provided hereinafter. It should be understood, however, that the detailed description and specific examples, while indicating the preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 4 is an exploded perspective view of the support arm assembly of the adjustable support structure; and FIG. 5 is a partial schematic view of the electrical circuit according to the present invention.

DETAILED DESCRIPTION OF THE PREFERRED EMBODIMENTS

Figure 1:
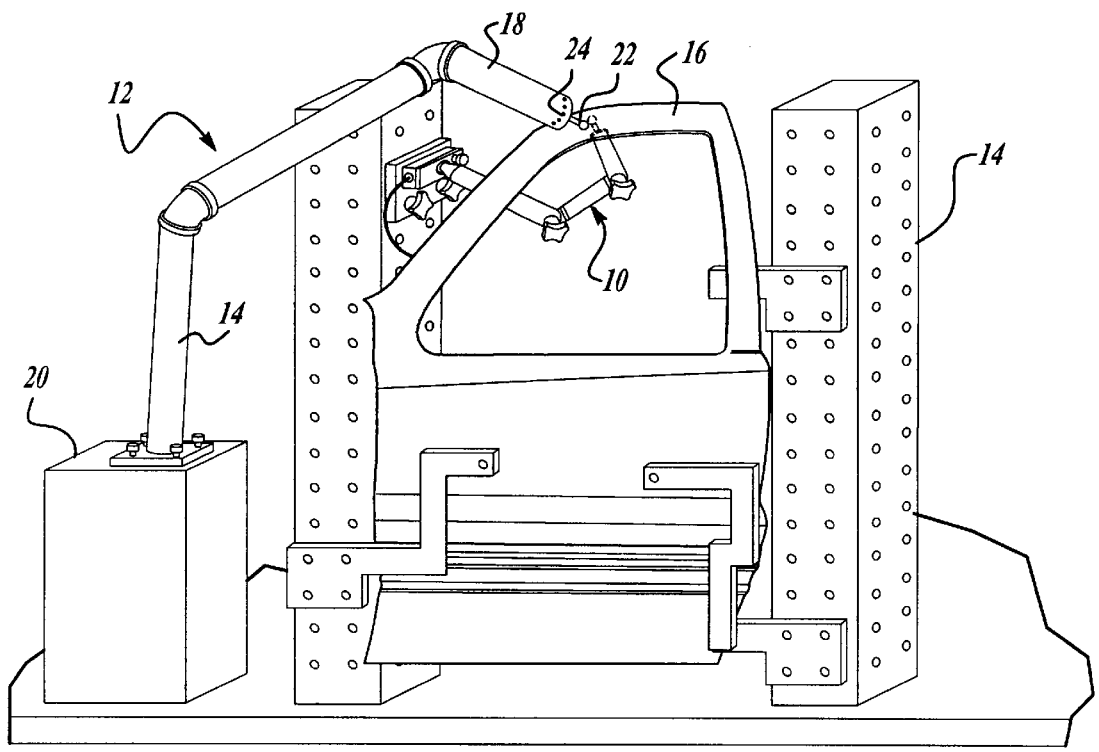
FIG. 1 is an environmental view of a portable coordinate measuring machine incorporating an adjustable support member according to a preferred embodiment of the present invention.

The following description of the preferred embodiment is merely exemplary in nature and is in no way intended to limit the invention, its application, or uses.

Referring to the drawings, a presently preferred embodiment of an adjustable support structure 10 is shown incorporated into a portable coordinate measuring machine 12 (CMM). Portable CMM 12 includes two support pillars 14 for holding an object, such as a vehicle door 16. Portable CMM 12 further includes a manipulating arm 18 attached to a base 20 for measuring various points along vehicle door 16 relative to a three-dimensional coordinate system as defined by portable CMM 12. Typically, measurement data is collected by positioning a measuring element 22, which is disposed at an end of manipulating arm 18 of portable CMM 12, upon a portion of door 16 to be measured. Data collection buttons 24 are then actuated to record the positional values of measuring element 22, as defined by the CMM's coordinate system.

Figure 2:
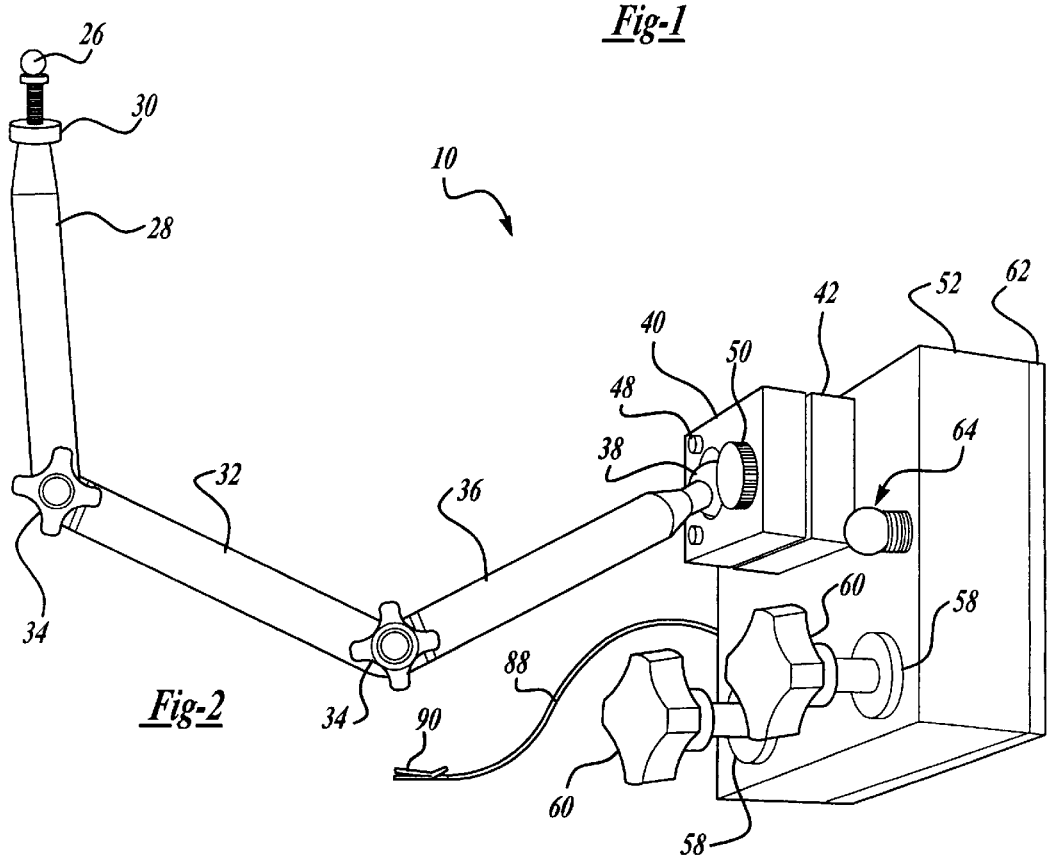
FIG. 2 is a perspective view of the adjustable support structure.
Figure 3:
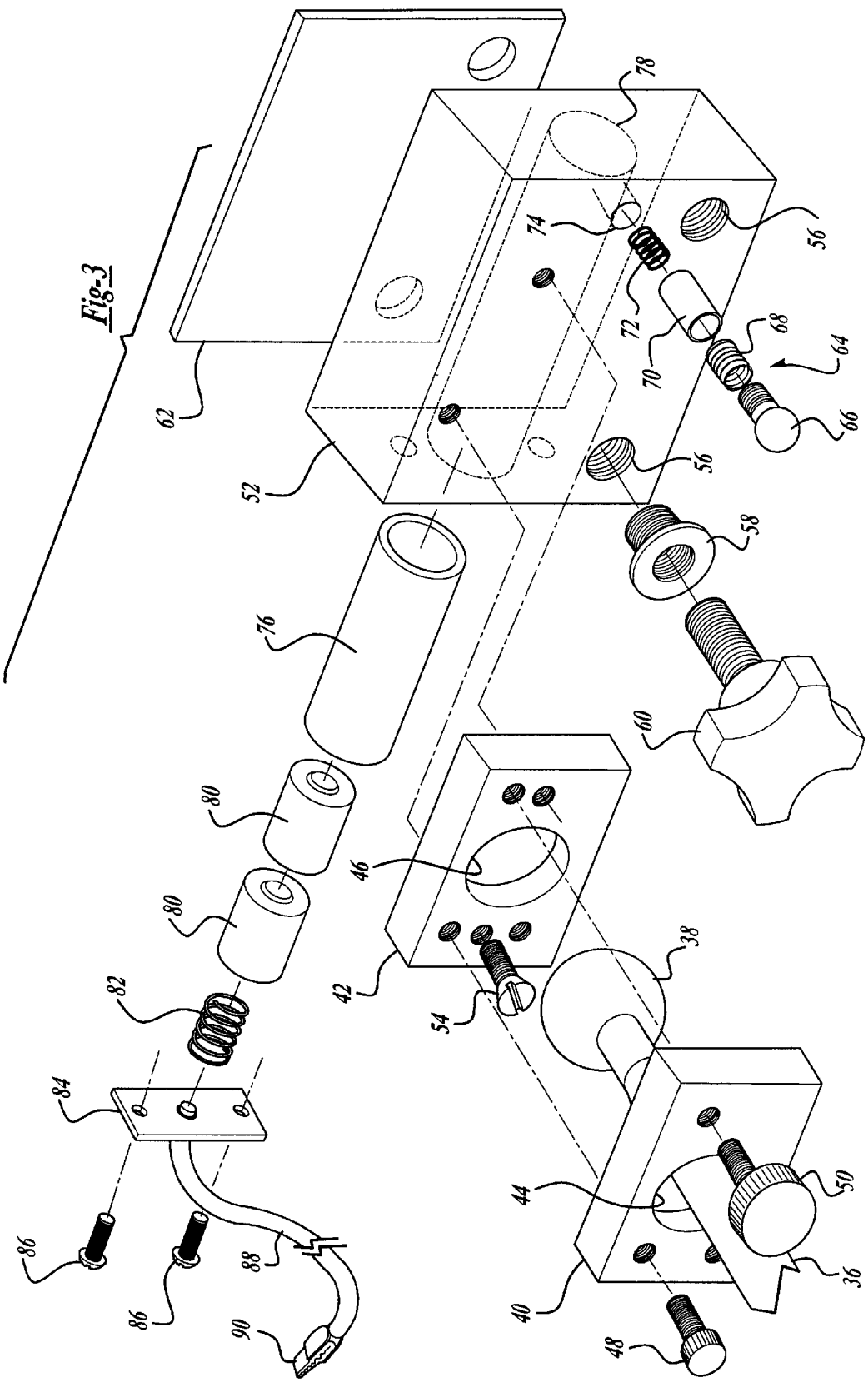
FIG. 3 is an exploded perspective view of the base portion of the adjustable support structure.

As seen in FIGS. 2–4, adjustable support structure 10 includes a point support post 26 threadedly engaged with a first support arm 28. A locking nut 30 is positioned between point support post 26 and first support arm 28 to maintain the position of point support post 26 after adjustment. As best illustrated in FIG. 2, first support arm 28 is attached to second support arm 32 using thumb screw 34. Thumb screw 34 is of a design which is commonly known in the art. Similarly, second support arm 32 is attached to a third support arm 36 using an additional thumb screw 34. As best seen in FIG. 4, third support arm 36 includes a swivel ball 38 disposed within an end of third support arm 36. Swivel ball 38 is retained within third support arm 36 employing methods known in the art, such as threaded engagement or retaining screw.

Referring now to FIG. 3, swivel ball 38 is secured in position by establishing a press-fit connection between a top swivel plate 40 and a bottom swivel plate 42. Specifically, top swivel plate 40 includes an aperture 44 having an inner diameter which is smaller than the outer diameter of swivel ball 38. Similarly, bottom swivel plate 42 includes an aperture 46 having an inner diameter which is smaller than the outer diameter of swivel ball 38. This configuration enables swivel ball 38 to be frictionally retained between top swivel plate 40 and bottom swivel plate 42 when fasteners 48 (only one shown) and lock screw 50 are tightened.

Still referring to FIG. 3, bottom swivel plate 42 is fastened to a base portion 52 using fasteners 54 (only one shown).

Base portion 52 includes a pair of apertures 56 for receiving a pair of insulators 58 (only one shown). Base portion 52 is rigidly secured to support pillar 14 using a pair of thumb screws 60 (only one shown). As best seen in FIG. 2, a base insulator 62 is mounted to base portion 52 using methods known in the art, such as glue. Base insulator 62 prevents electrical contact between adjustable support structure 10 and support pillar 14.

Preferably, point support post 26 is made of hardened steel to minimize wear. However, any material capable of providing sufficient electrical continuity and sufficient resistance to wear may be employed. First support arm 28, second support arm 32, third support arm 36, swivel ball 38, bottom swivel plate 42, and base portion 52 are all preferably made of aluminum. However again, any material capable of providing sufficient electrical continuity may be employed.

As shown in FIGS. 2 and 3, adjustable support structure 10 further includes a signalling or indicator device 64 having a bulb 66, a coil retainer 68, a bulb insulator 70, and a bulb spring 72 disposed within an aperture 74 of base portion 52. Indicator device 64 further includes a battery insulator sleeve 76 disposed within a bore 78 of base portion 52. Battery insulator sleeve 76 receives a pair of batteries 80 and a battery spring 82. A retaining plate 84 retains battery spring 82, batteries 80, and battery insulator sleeve 76 within bore 78 of base portion 52 using fasteners 86. Still further, indicator device 64 includes a wire 88 and a fastening clip 90 for connection with vehicle door 16.

As best seen in FIGS. 3 and 5, indicator device 64 is disposed in an electrical circuit, wherein the negative terminal of battery 80 is in electrical contact with battery spring 82, first lead or wire 88, and fastening clip 90. Fastening clip 90 is fastened to vehicle door 16 to provide electrical communication. The positive terminal of battery 80 is in electrical contact with bulb spring 72 and the positive terminal of bulb 66 of signal output 64 via a second lead 91. Bulb insulator 70 prevents bulb spring 72 from contacting base portion 52 so as to prevent false contact signals by prematurely closing the electrical circuit. Coil retainer 68 retains bulb 66 within aperture 74 of base portion 52 and further provides electrical continuity between the negative terminal of bulb 66 and base portion 52, generally indicated as 92. Additionally, through metal-to-metal contact, base portion 52 is in electrical communication with point support post 26. Meanwhile, base insulator 62, bulb insulator 70, insulators 58, and battery insulator sleeve 76 all prevent false signals caused by short circuits through metal-to-metal contact and are preferably nylon fiber insulators.

In operation, vehicle door 16 is rigidly secured to support pillars 14. Adjustable support structure 10 is then secured to support pillar 14. To this end, thumb screws 60 are tightened to secured adjustable support structure 10 to support pillar 14. Lock screw 60 and thumb screws 34 are then loosened to permit first support arm 28, second support arm 32, and third support arm 36 to be pivoted relative to each other into a preferred position. Such a preferred position is generally defined as that when point support post 26 is near, without contacting, vehicle door 16 and first support arm 28 is generally perpendicular to a surface of vehicle door 16 to be measured.

Thumb screws 34 and lock screw 50 are then secured to prevent movement of first support arm 28, second support arm 32, or third support arm 36. Fastening clip 90 is then fastened to vehicle door 16 in a location which is electrically conductive with an area to be measured. Locking nut 30 is then disengaged from first support arm 28 to permit point support post 26 to be threadedly extended toward vehicle door 16. Point support post 26 is extended until minimal contact is made with vehicle door 16, thereby establishing electrical continuity between the negative terminal of batteries 80 and the negative terminal of bulb 66. Specifically, continuity is established between battery spring 82; wire 88; fastening clip 90; vehicle door 16; point support post 26; support arms 28, 32, 36; swivel plates 40, 42; base portion 52; and coil retainer 68, thereby grounding bulb 66 and illuminating indicator device 64. Locking nut 30 is then tightened to prevent movement of point support post 26. As a result of the foregoing, installation and adjustment of adjustable support structure 10 is achieved, relative to vehicle door 16, so as to insure minimum deformation and provide maximum support of vehicle door 16.

It is anticipated that the objectives of the present invention can also be obtained by using an audible signal as opposed to a visual signal, or a combination thereof, to accommodate environmental variations in the testing area. These audible signals may be produced through implementation of a speaker system.

It is further anticipated that the objectives of the present invention can also be obtained by employing a pressure sensor, rather than electrical contact, to signal contact with non-metallic objects, such as fiberglass vehicle body parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for supporting an object to be measured by a coordinate measuring machine, said apparatus comprising:
   a main support structure adapted for primarily supporting the object;
   an adjustable secondary support structure adapted for supporting a localized portion of the object; and
   an indicator device indicating when said adjustable secondary support structure contacts the object.

2. The apparatus of claim 1 wherein said adjustable support structure comprises:
   a base structure;
   at least one pivotable support arm rotatably mounted to said base structure; and
   a point support member telescopically engaged with one of said at least one pivotable support arms.

3. The apparatus of claim 1 wherein said indicator device comprises:
   at least one battery having a positive and a negative terminal;
   a signal output having a positive and a negative terminal for outputting a signal to an operator;
   a negative lead being in electrical communication with said negative terminal of said at least one battery, said negative lead further being in electrical communication with the object to be measured;
   a positive lead being in electrical communication with said positive terminal of said at least one battery, said positive lead further being in electrical communication with said positive terminal of said signal output; and
   a testing lead being in electrical communication with a point support member of said adjustable support structure, said testing lead further being in electrical communication with said negative terminal of said signal output, thereby causing said signal output to output a signal to the operator when said point support member contacts the object.

4. The apparatus of claim 3, further comprising a plurality of insulators for electrically insulating said testing lead of said indicator device from a pillar support of the coordinate measuring machine.

5. The apparatus of claim 3 wherein said signal output includes an incandescent bulb.

6. The apparatus of claim 3 wherein said signal output includes an audible signal.

7. A coordinate measuring machine for measuring an object, said coordinate measuring machine comprising:
   a base;
   at least one measuring element support member rotatably fixed to said base;
   a measuring element disposed on an end of said at least one measuring element support member;
   an adjustable support structure adapted for supporting a localized portion of the object to be measured, said adjustable support structure being mounted to said base; and
   a signalling device signalling when said adjustable support structure contacts said object.

8. The coordinate measuring machine of claim 7 wherein said adjustable support structure comprises:
   a base structure mounted to said base of the coordinate measuring machine;
   at least one pivotable support arm rotatably mounted to said base structure; and
   a point support member telescopically engaged with one of said at least one pivotable support arms.

9. The coordinate measuring machine of claim 7 wherein said indicator device comprises:
   at least one battery having a positive and a negative terminal;
   a signal output having a positive and a negative terminal for outputting a signal to an operator;
   a negative lead being in electrical communication with said negative terminal of said at least one battery, said negative lead further being in electrical communication with said object to be measured;
   a positive lead being in electrical communication with said positive terminal of said at least one battery, said positive lead further being in electrical communication with said positive terminal of said signal output; and
   a testing lead being in electrical communication with a point support member of said adjustable support structure, said testing lead further being in electrical communication with said negative terminal of said signal output, thereby causing said signal output to output a signal to the operator when said point support member contacts said object.

10. The coordinate measuring machine of claim 9, further comprising a plurality of insulators for electrically insulating said testing lead of said indicator device from a pillar support of the coordinate measuring machine.

11. The coordinate measuring machine of claim 9 wherein said signal output include an incandescent bulb.

12. The coordinate measuring machine of claim 9 wherein said signal output include an audible signal.

13. A method of measuring a vehicle part using a coordinate measuring machine, said method comprising:
   securing the vehicle part upon a base structure of the coordinate measuring machine;
   attaching at least one adjustable rotatable support arm to said base structure;
   adjusting said at least one adjustable rotatable support arm such that said arm generally lightly contacts the vehicle part so as to avoid deformation of the vehicle part, said contact thereby triggering a signalling device for signalling an operator that said contact is achieved; and
   employing a probe of the coordinate measuring machine to gather position data along the vehicle part generally adjacent said at least one adjustable rotatable support arm.

* * * * *